(12) United States Patent
Livne et al.

(10) Patent No.: US 10,115,135 B2
(45) Date of Patent: Oct. 30, 2018

(54) SYSTEM AND METHOD TO SUPPORT DIAMETER CREDIT CONTROL SESSION REDIRECTION USING SCIM/SERVICE BROKER

(71) Applicant: Oracle International Corporation, Redwood Shores, CA (US)

(72) Inventors: Shlomo Livne, Ra'anana (IL); Vladimir Furman, Fair Lawn, NJ (US); Renana Seidman, Raanana (IL); Tzach Livyatan, Tel-Aviv (IL)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 467 days.

(21) Appl. No.: 13/934,904

(22) Filed: Jul. 3, 2013

(65) Prior Publication Data

US 2015/0012415 A1 Jan. 8, 2015

(51) Int. Cl.
*G06Q 30/04* (2012.01)
*H04M 15/00* (2006.01)
*H04M 17/02* (2006.01)
*H04M 17/00* (2006.01)

(52) U.S. Cl.
CPC ............ *G06Q 30/04* (2013.01); *H04M 15/64* (2013.01); *H04M 15/8228* (2013.01); *H04M 17/02* (2013.01); *H04M 17/20* (2013.01); *H04M 17/204* (2013.01); *H04M 17/207* (2013.01); *H04M 17/202* (2013.01)

(58) Field of Classification Search
CPC ...................................................... G06Q 30/04
USPC ........................................................ 705/39
See application file for complete search history.

(56) References Cited

U.S. PATENT DOCUMENTS

| 8,582,473 B2 * | 11/2013 | Ramankutty | ........... H04L 12/66 370/259 |
| 2013/0315106 A1 * | 11/2013 | Anulf | ................. H04L 12/1467 370/259 |

* cited by examiner

*Primary Examiner* — Jason Borlinghaus
*Assistant Examiner* — Ambreen A. Alladin
(74) *Attorney, Agent, or Firm* — Tucker Ellis LLP (57) ABSTRACT

A system and method which overcome the limitations of online charging systems which do not natively support redirection functionality. In an embodiment of the invention a SCIM provides the added redirection functionality to online charging systems which do not natively support redirection functionality. The SCIM supports redirection of a user session to a process application in a manner which allows the user to easily continue with the activity the user was engaged. If selected criteria are met the SCIM can update credit control answers (CCA) with redirection information to redirect the session to an application.

18 Claims, 6 Drawing Sheets

Figure 1A

RFC4006 - Appendix Flow VIII

Prior Art

SYSTEM AND METHOD TO SUPPORT DIAMETER CREDIT CONTROL SESSION REDIRECTION USING SCIM/SERVICE BROKER

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to charging in telecommunications networks and in particular to a system and method Diameter credit control redirection.

BACKGROUND

The Diameter Credit Control Application is specified in RFC 4006. It can be used to provide real-time credit control for various applications, including, for example, messaging services, gaming services, video services, etc. The Application is used between the network element providing the service (client) and a credit control server. Redirection of sessions is used by Diameter Credit Control Applications (DCCA-RFC 4006) as a means to redirect a user to a different destination to engage with additional services. This includes, for example redirection of prepaid users to a service for adding additional credit to a prepaid account in a top-up process. Redirection is a key enabler for advanced charging features such as On-The-Fly top-up.

However, while some online charging systems support redirection of sessions, others do not support this functionality. These online charging systems would simply return a result-code 4012 DIAMETER_CREDIT_LIMIT_REACHED, and would expect the user to access the Top-up server in a new session directly. In such cases the user session is terminated. This is disadvantageous to the user because the user is unable to easily continue with the activity the user was engaged in. This is also disadvantageous to the service provider, because the user may choose not to consume further services and/or may choose not to add additional credits to their user account.

It would therefore be desirable to provide systems and methods which overcome the limitations of online charging systems which do not natively support redirection functionality.

SUMMARY

Embodiments of the present invention provide systems and methods which overcome the limitations of online charging systems which do not natively support redirection functionality. The system and method augment the functionality of online charging systems which do not natively support redirection functionality by providing a mechanism to redirect the user session to an application. As an example, the redirection to an application provides a means for the user to add credits to the user account and easily continue with the activity the user was engaged. This is advantageous both to the user and the service provider. Furthermore, the redirection criteria and target application are configurable to achieve whatever functionality is desired by the operator.

In an embodiment of the invention an online mediation system includes a SCIM having a redirection module which provides added redirection functionality to online charging systems which do not natively support redirection functionality. The SCIM uses the redirection module to redirect Diameter Credit Control Answers (CCA) from the OCS based on CCA message criteria. The redirection module can be configured to redirect based on configurable CCA attributes such as low balance or Final-Unit-Indication (FUI). If the selected criteria are met the redirection module can insert redirection content into CCA to redirect the session to an application.

In an embodiment of the invention, a method is provided for providing redirection functionality to an online charging system (OCS) which does not natively support redirection. The method includes: receiving a Credit Control Request (CCR) from said Charging Trigger Function (CTF); forwarding the CCR to said OCS; receiving a credit control answer CCA directed to the Charging Trigger Function (CTF) from said OCS; comparing the CCA against criteria for redirection. If the CCA does not meet the criteria, the CCA is forwarded to the CTF. If the CCA meets the criteria, a Redirection CCA is composed and transmitted to the CTF. The Redirection CCA may be based on the CCA received from the OCS and include amended and/or additional Attribute Value Pairs (AVPs). One or more added AVPs can provide, for example, redirection of a user session towards a top-up server without requiring termination of a current user session.

Other objects and advantages of the present invention will become apparent to those skilled in the art from the following detailed description of the various embodiments, when read in light of the accompanying drawings.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

Common reference numerals are used to indicate like elements throughout the Figures and detailed description; therefore, reference numerals used in a Figure may or may not be referenced in the detailed description specific to such figure if the element is described elsewhere. The first digit in a three digit reference numeral indicates the series of Figures in which the element first appears.

Although the Figures depict components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

The Diameter Credit Control Application is specified in RFC 4006. It can be used to provide real-time credit control for various applications, including, for example, messaging services, gaming services, video services, etc. The Application is used between the network element providing the service (client) and a credit control server (online charging system). Redirection of sessions is used by Diameter Credit Control Applications (DCCA-RFC 4006) as a means to redirect a user to a different destination to engage with additional services. This includes, for example redirection to a service for adding additional credit to an account "top-up."

Figure 1A:
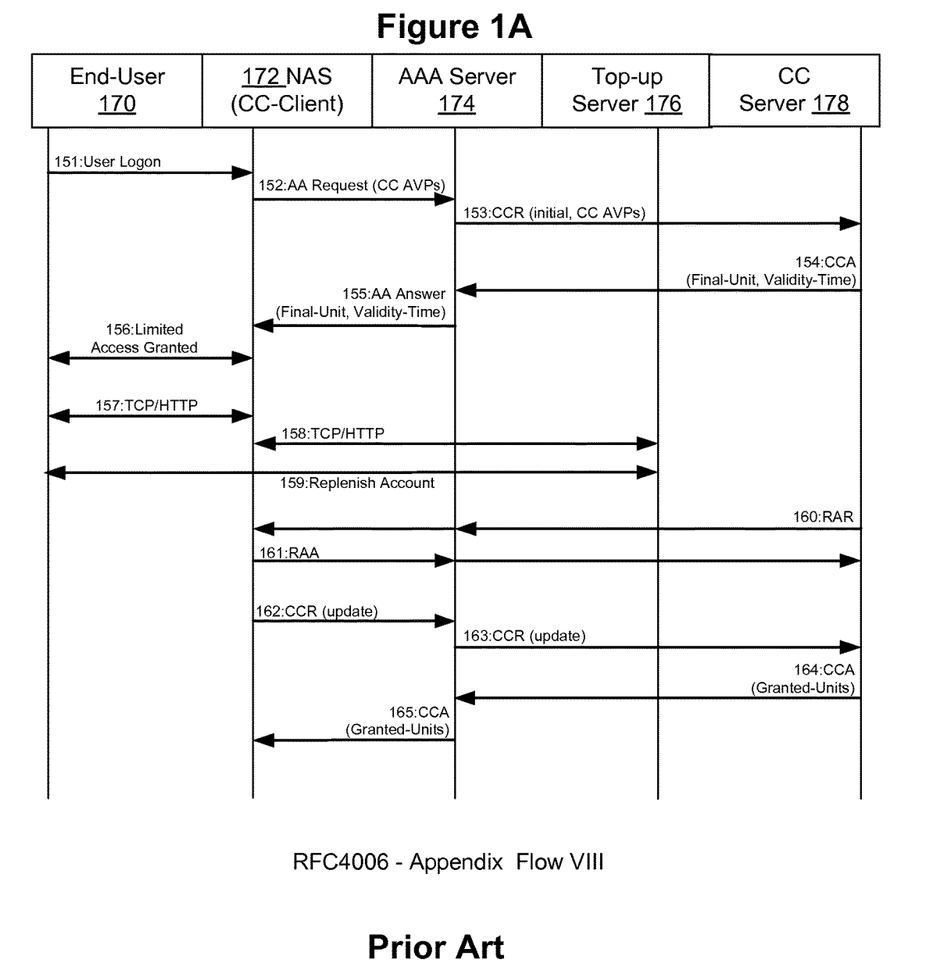
FIG. 1A shows the standard sequence diagram for redirection of the Diameter Credit Control Application (Prior Art).

FIG. 1A shows the standard sequence diagram for redirection of the Diameter Credit Control Application as specified in Appendix VIII of RFC4006. End User 170 sends a logon message 151 to Network Access Server (NAS) 172. In response NAS 172 sends an AA (Authentication and Authorization) Request 152 to AAA (Authentication, Authorization, and Accounting) Server 174. In response AAA Server 174 sends an initial CCR (Credit Control Request) message 153 to CC (Credit Control) Server 178. In response CC Server 178 sends a CCA (Credit Control Answer) message 154 to AAA Server 174. In response AAA Server 174 sends an AA (Authentication and Authorization) Answer message 155 to NAS 172. The AA message 155 carries the result of the corresponding credit control request. NAS 172 is thus able to grant limited access 156 to End-user 170.

As illustrated, End User 170 does not have enough credits in the CC Server 178. Thus CC server 178 is redirecting the End User 170 to the Top-up Server 176 by including in the CCA response 154 the Final-unit parameter. Top-up Server 176 provides a mechanism by which End-User 170 can add to the credits available from CC Server 178. In response to the Final-unit parameter, End-User 170 interacts 157 with NAS 172 using the selected mechanism (e.g. TCP/HTTP) and is redirected 158 to Top-up server 176. End-User 170 can then interact 159 with Top-up Server 176 to replenish the account e.g. add more funds, credits, time etc.

Subsequent to the top-up transaction. CC Server 178 transmits a RAR (Re-Auth-Request) message 160 via AAA Server 174 to NAS 172. The purpose of the RAR message is to trigger a new CCR after e.g. a successful replenishment of credit using a top-up transaction. NAS 172 responds with a RAA (Re-Auth-Answer) message 161. In response NAS 172 sends an update CCR request 162 to AAA Server 174. In response AAA Server 174 sends an update CCR request 163 to CC Server 178. In response CC Server 178 sends a CCA response 164 to AAA Server 174 reflecting the granted units including units added during the top-up transaction. In response AA Server 174 sends a CCA response 165 to NAS 172 reflecting the granted units including units added during the top-up transaction.

However, not all Online Charging Systems (Credit Control Servers) include the capability to support redirection in accordance with Appendix VIII of RFC4006 shown in FIG. 1. Online Charging Systems (OCS) which do not support redirection would return a CCA response including the result code 4012 DIAMETER_CREDIT_LIMIT_REACHED. The End User 170 is denied authorization for the service accessed and the End User 170 is expected to access the Top-Up Server 176 independently. This is disruptive to the End Users attempt to access the service and is less desirable than providing a mechanism for the End User to increase the available credit and/or seamlessly continue the present session.

Figure 1B:
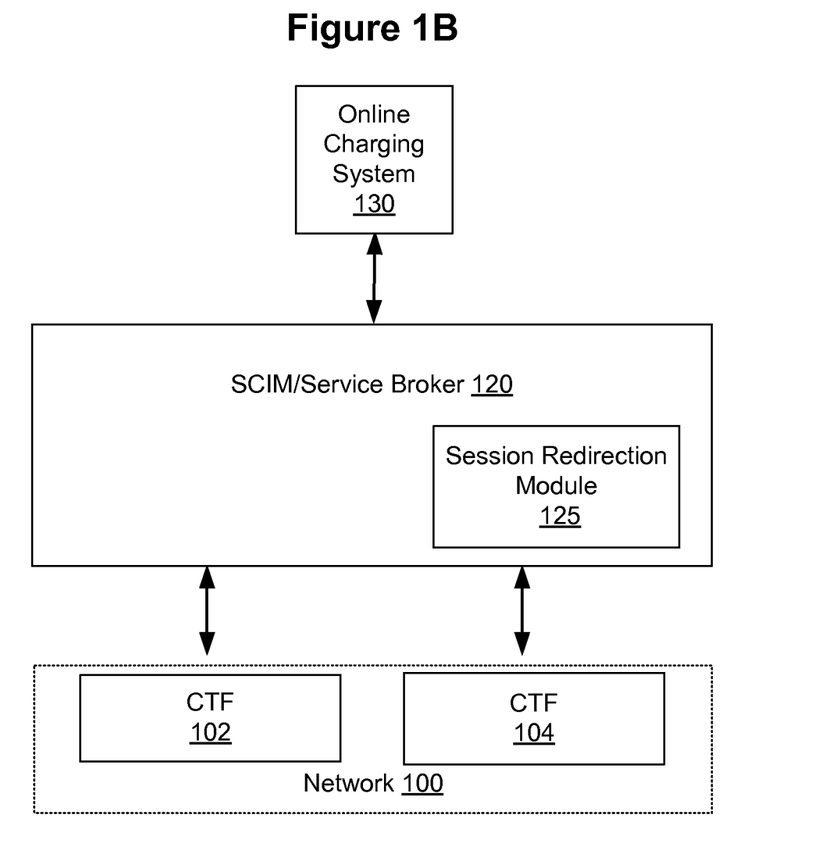
FIG. 1B shows a SCIM including augmented redirection functionality according to an embodiment of the invention.

FIG. 1B shows a Service Capability Interaction Manager (SCIM) 120 which includes a Session Redirection Module 125 to provide enhanced charging capabilities in accordance with an embodiment of the invention. SCIM 120 supports a flexible charging infrastructure which maximizes existing charging components while introducing new services that may have unique charging requirements that span multiple charging systems. SCIM 120 acts as an interface for one or more Online Charging System (OCS) 130. SCIM 120 can interact with a plurality of Charging Trigger Functions (CTF) 102, 104. SCIM 120 provides the ability to combine the service logic of multiple services and deliver the combined services to sessions in the network.

In an embodiment of the present invention SCIM 120 includes a Redirection Module 125. Redirection Module 125 allows SCIM 120 to interactively redirect Diameter Credit Control messages based on CCA message criteria. Redirection Module 125 is in some embodiments a separate application activated by SCIM 120. The functionality of Redirection Module 125 is alternatively built-in to the logic of SCIM 120.

Redirection Module 125 can be configured to redirect based on CCA attributes such as low balance or Final-Unit-Indication (FUI). For example, when an OCS replies with a CCA containing a low credit notification, SCIM can redirect the session to a top-up application as described below. Redirection Module 125 of SCIM 120 performs session redirection when it receives a CCA response containing one of the following criteria values from an OCS indicating a low or empty account balance for the subscriber:

FUI (Final-Unit-Indicator)
NO_MONEY_NOTIFICATION
LOW_CREDIT_NOTIFICATION

Redirection Module 125 of SCIM 120 supports both the immediate and non-immediate redirection of sessions. For example, immediate redirection can be used in cases where a subscriber receives a zero balance CCA. Non-immediate redirection can be used for scenarios where the CCA includes usable remaining resources that allow a session to continue for a specified time before redirection. Note that although in this example, Redirection Module 125 of SCIM 120 redirects the session to a top-up application, the redirection is entirely configurable such that the target application and the CCA attributes which cause redirection can be configured to mediate the functionality desired by the operator.

Figure 2A:
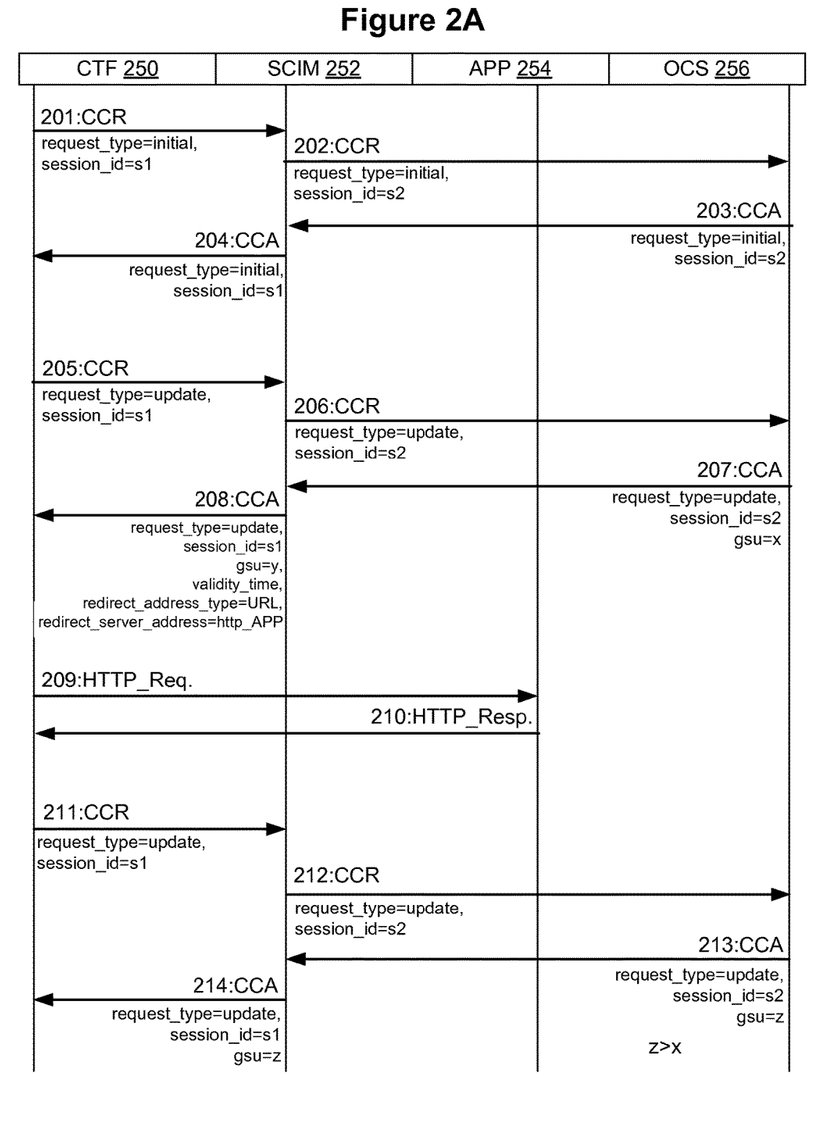
FIGS. 2A-2C show sequence diagrams illustrating redirection of Diameter Credit Control Answers (CCA) according to embodiments of the invention.
Figure 2B:
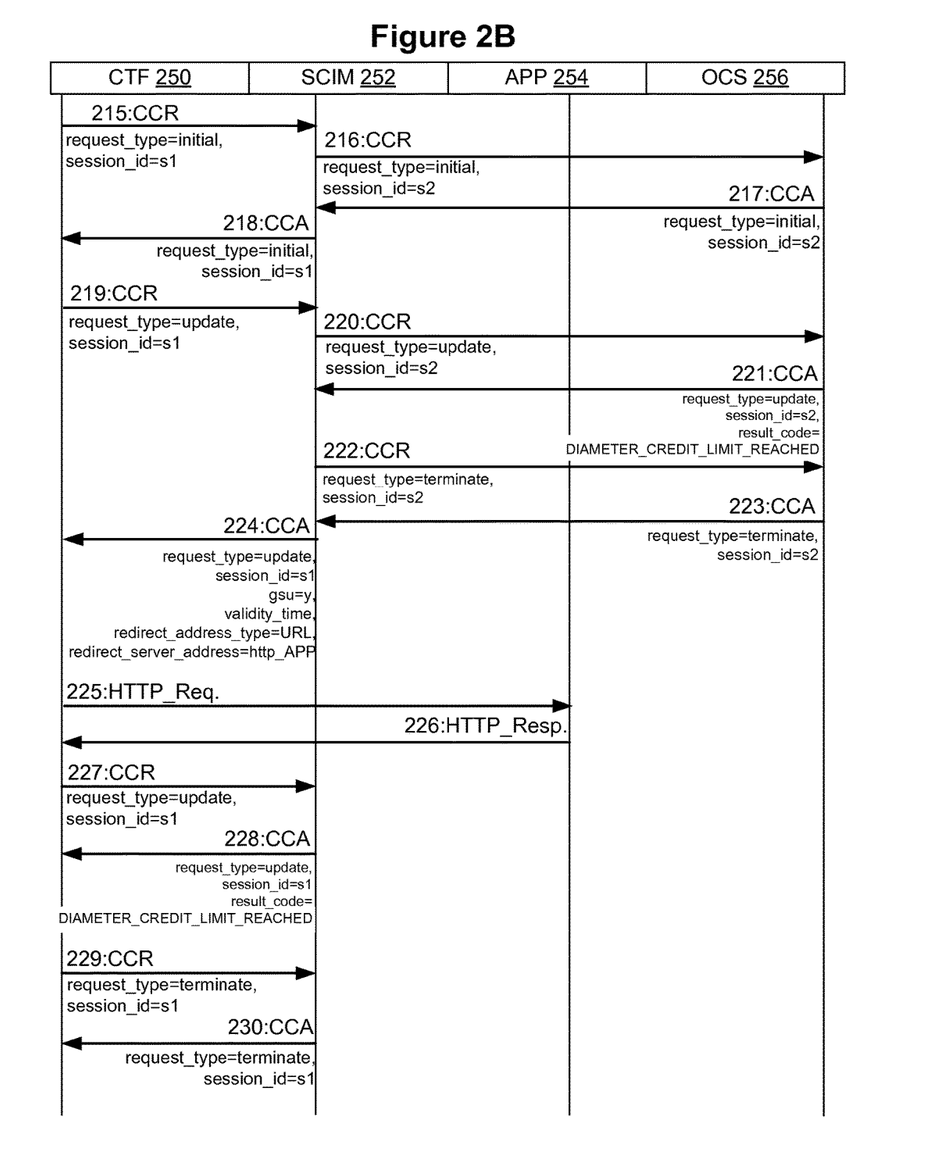
Figure 2C:
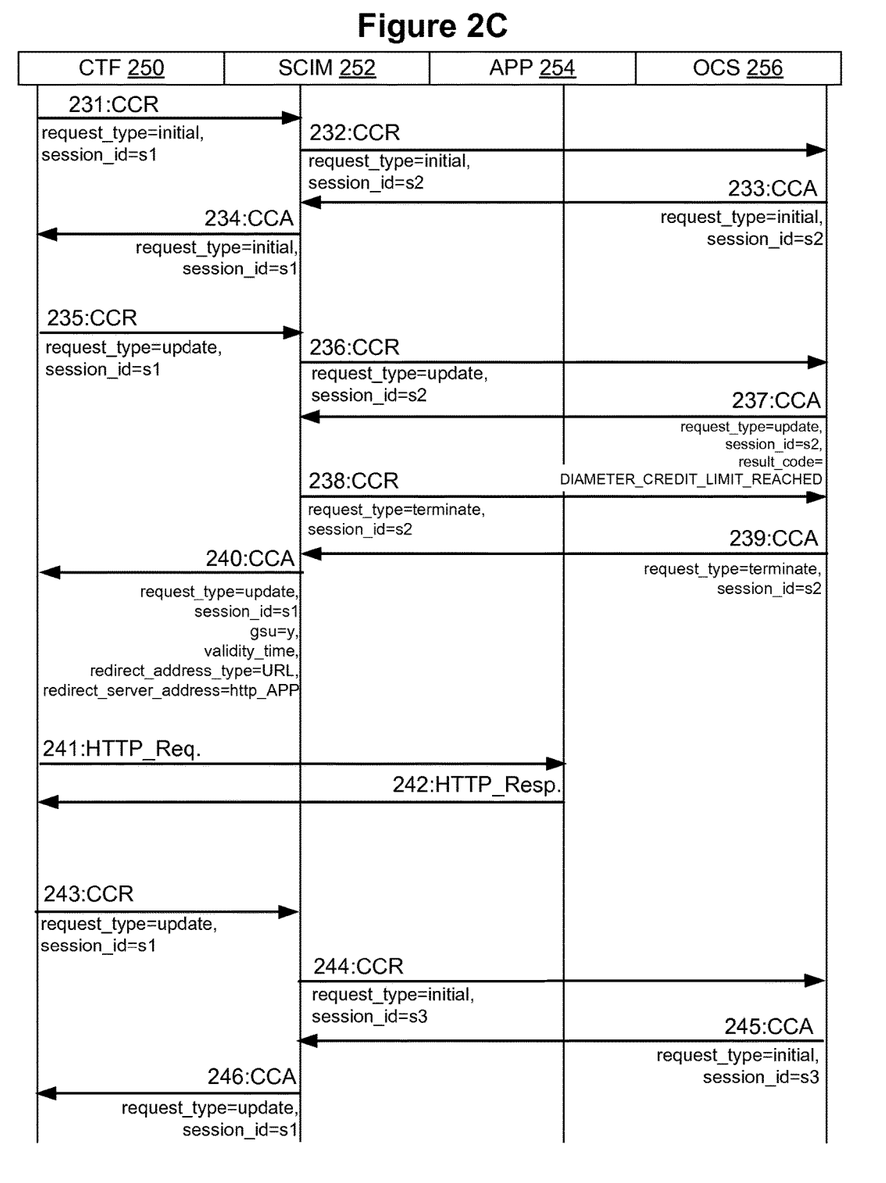

FIGS. 2A-2C show sequence diagrams illustrating redirection of Diameter Credit Control Answers (CCA) from an OCS (Online Charging System) 256 by SCIM 252 to an APP 254 according to embodiments of the invention. According to embodiments of the invention, SCIM 252 can conditionally update the returned information from OCS 256 and provide support for redirection, even if the OCS 256 does not support redirection, so that the user will be redirected in the existing session to a new destination (e.g. a Top-up Application) APP 254. SCIM 252 provides functionality which supports cases in which:

OCS 256 terminates the session (e.g. returning no credits): in this case the existing user session can be redirected and a new OCS session may be started; and The OCS 256 does not terminate the session (e.g. returns final allocation/other condition): in this case the existing user session may be redirected immediately or after the allocated units have been consumed.

The following Table I provides the supported configuration and Table II explains the meaning of the Redirection Information parameters of Table I. The parameters may be included in the redirection CCA composed by the CCA as AVPs in addition to the required AVPs, for example session-id, event-type etc. The AVP includes the attribute e.g. Redirect-Address-Address followed by the value i.e the address of the target application (APP). The Redirection CCA may be based on the CCA received from the OCS (which includes the required AVPs for example session-id, event-type etc).

TABLE I

| Condition | Redirection Information |
| --- | --- |
| Session Termination (e.g. Result-Code = X, etc.) | Redirect Address Type<br>Redirect Address<br>Validity Time<br>Start OCS Session After Redirection |
| Session Not Terminated (e.g. OCS returned a threshold crossed etc) | Redirect Address Type<br>Redirect Address<br>Validity Time<br>Immediate |

TABLE II

| Parameter | Type | Range;<br>Default Value | Description |
| --- | --- | --- | --- |
| Validity-Time | Integer | 600 seconds default | How long the subscriber is allowed to use network resources. |
| Redirect-Address-Type | Enum | IPv4 Address<br>IPv6 Address<br>URL<br>SIP URI | Defines the address type of the address given in the Redirect-Server-Address AVP. |
| Redirect-Address-Address | String | | Defines the address of the redirect server (Top-Up Application). |
| Immediately | Boolean | True/False | Whether to redirect immediately or after GSU consumed. |
| Continue Session After Redirection | Boolean | True/False | Whether to start a new OCS session after redirection. |

FIG. 2A is a sequence diagram which illustrates how SCIM 252 would redirect a non-terminated session toward a APP 254 and continue the session after redirection. As shown in FIG. 2A, an End-User accessing a service (not shown) interacts with the CTF (Charging Trigger Function) 250. CTF 250 is a function of a NAS responsible for supervision of service delivery and, in particular, limiting service delivery in accordance with credit units granted by an Online Charging System (OCS) 256.

With messages 201-204 a session is initiated from the network element (CTF 250) through the SCIM 252 toward the OCS 256. CTF 250 sends an initial CCR message 201 to SCIM 252. SCIM 252 sends an initial CCR message 202 to OCS 256. Note that SCIM 252 uses its own session_id=s2 to identify the session. In response, OCS 256 returns a CCA message 203 to SCIM 252. SCIM 252 returns a corresponding CCA message 204 to CTF 250. Note that CCA message 203 includes the session_id=s2 identified by SCIM 252 whereas CCA message 204 includes the session_id=s1 identified by CTF 250.

With messages 205-206 an update request is received requesting additional units. CTF 250 sends an update CCR message 205 to SCIM 252 requesting additional units. In response, SCIM 252 sends an update CCR message 206 to OCS 256. In response OCS 256 sends an update CCA message 207 specifying a Granted-Service Unit (GSU=x). Based on the configuration of SCIM 252, SCIM 252 recognizes GSU=x as indicating a low number of credits and determines the need to redirect to the APP 254. SCIM 252 therefore redirects the session to the APP 254 by sending an update CCA message 208 which specifies Granted-Service Unit (GSU=y), validity_time, redirect_address_type, and redirect_address.

In response to CCA message 208, CTF 250 redirects the session to APP 254. User interacts with APP 254 using, for example, HTTP request 209 and HTTP response 210, for example, to enable the end user to purchase, or authorize additional credits to be made available by OCS 256. Note that the form of the messages and the server address will be governed by the redirect_address_type, and redirect_address and may include IPv4 Address, IPv6 Address, URL, and or SIP URI.

After the session redirection CTF 250 sends another update CCR message 211 to SCIM 252 requesting additional units. In response, SCIM 252 sends an update CCR message 212 to OCS 256. In response OCS 256 sends an update CCA message 213 specifying a Granted-Service Unit (GSU=z). Note, for example, that z>x because the number of credits available has been increased during the top-up transaction. Because of the higher available credits, SCIM 252 now provides an update CCA message 214 to CTF 250 specifying a Granted-Service Unit (GSU=z).

FIG. 2B is a sequence diagram which illustrates how SCIM 252 would redirect a terminated session toward an APP 254 and terminate the session toward the user after redirection. As shown in FIG. 2B, an End-User accessing a service (not shown) interacts with the CTF (Charging Trigger Function) 250. CTF 250 is responsible for supervision of service delivery and, in particular, limiting service delivery in accordance with credit units granted by an Online Charging System (OCS) 256.

In 215-218 a session is initiated from the network element CTF 250 through the SCIM 252 toward the OCS 256. CTF 250 sends an initial CCR message 215 to SCIM 252. SCIM 252 sends an initial CCR message 216 to OCS 256. Note that SCIM 252 uses its own session_id to identify the session. In response, OCS 256 returns a CCA message 217 to SCIM 252. SCIM 252 returns a corresponding CCA message 218 to CTF 250. Note that CCA message 217 includes the session_id=s2 identified by SCIM 252 whereas CCA message 218 includes the session_id=s1 identified by CTF 250.

With messages 219-220 an update request is received requesting additional units. CTF 250 sends an update CCR message 219 to SCIM 252 requesting additional units. In response, SCIM 252 sends an update CCR message 220 to OCS 256. In response OCS 256 sends an update CCA message 221 specifying the result code DIAMETER_CREDIT_LIMIT_REACHED to SCIM 252. In response SCIM 252 sends a CCR message 222 to OCS 256 terminating session_id=2 toward OCS 256. In response OCS 256 send the CCA message 223 terminating session_id=2.

However, SCIM 252 does not immediately terminate the session_id=1 towards the client but first redirects towards the APP 254. SCIM 252 redirects the session to the APP 254 by sending an update CCA message 224 which specifies Granted-Service Unit (GSU=y), validity_time, redirect_address_type, and redirect_address.

In response to CCA message 224, CTF 250 redirects the session to APP 254. User interacts with APP 254 using, for example, HTTP request 225 and HTTP response 226. Note that the form of the messages and the server address will be governed by the redirect_address_type, and redirect_address and may include IPv4 Address, IPv6 Address, URL, and or SIP URI.

After the session redirection CTF 250 sends another update CCR message 227 to SCIM 252 requesting additional units. In response, SCIM 252 sends an update CCA message 228 to CTF 250 specifying the result code DIAMETER_CREDIT_LIMIT_REACHED. In response CTF 250 sends a terminate CCR message 229 terminating session_id=1. In response SCIM 252 returns a terminate CCA message 230 terminating session_id=1 toward the end-user.

FIG. 2C is a sequence diagram which illustrates how SCIM 252 would redirect a terminated session toward APP 254 and then continue the session toward the user after redirection. As shown in FIG. 2C, an End-User accessing a service (not shown) interacts with the CTF (Charging Trigger Function) 250. CTF 250 is responsible for supervision of service delivery and, in particular, limiting service delivery in accordance with credit units granted by an Online Charging System (OCS) 256.

In 231-224 a session is initiated from the network element CTF 250 through the SCIM 252 toward the OCS 256. CTF 250 sends an initial CCR message 231 to SCIM 252. SCIM 252 sends an initial CCR message 232 to OCS 256. Note that SCIM 252 uses its own session_id to identify the session. In response, OCS 256 returns a CCA message 233 to SCIM 252. SCIM 252 returns a corresponding CCA message 234 to CTF 250. Note that CCA message 233 includes the session_id=s2 identified by SCIM 252 whereas CCA message 234 includes the session_id=s1 identified by CTF 250.

With messages 235-236 an update request is received requesting additional units. CTF 250 sends an update CCR message 235 to SCIM 252 requesting additional units. In response, SCIM 252 sends an update CCR message 236 to OCS 256. In response OCS 256 sends an update CCA message 237 specifying the result code DIAMETER_CREDIT_LIMIT_REACHED to SCIM 252. In response SCIM 252 sends a CCR message 238 to OCS 256 terminating session_id=2 toward OCS 256. In response OCS 256 send the CCA message 239 terminating session_id=2.

However, SCIM 252 does not immediately terminate the session_id=1 towards the user, but first redirects towards the APP 254. SCIM 252 redirects the session to the APP 254 by sending an update CCA message 240 which specifies Granted-Service Unit (GSU=y), validity_time, redirect_address_type, and redirect_address.

In response to CCA message 240, CTF 250 redirects session to APP 254. User interacts with APP 254 using, for example, HTTP request 241 and HTTP response 242 to enable, for example, the end user to purchase, or authorize additional credits to be made available by OCS 256. Note that the form of the messages and the server address will be governed by the redirect_address_type, and redirect_address and may include IPv4 Address, IPv6 Address, URL, and or SIP URI.

After the session redirection CTF 250 sends another update CCR message 243 to SCIM 252 requesting additional units. In response, SCIM 252 sends an initial CCR message 244 to OCS 256. Note that session_id=s3 reflecting the fact that SCIM 252 is initiating a new session towards OCS 256 (session_id=s2 having been previously terminated). OCS 256 responds with a CCA message 245. In response SCIM 252 sends an update CCA message 246 to CTF 250 continuing session_id=s1 towards the user. Note that in this scenario, SCIM 252 preserves the same session towards the user while terminating one session towards the OCS 256 and initiating a second session towards OCS 256 after the session has been redirected to the application.

Figure 3:
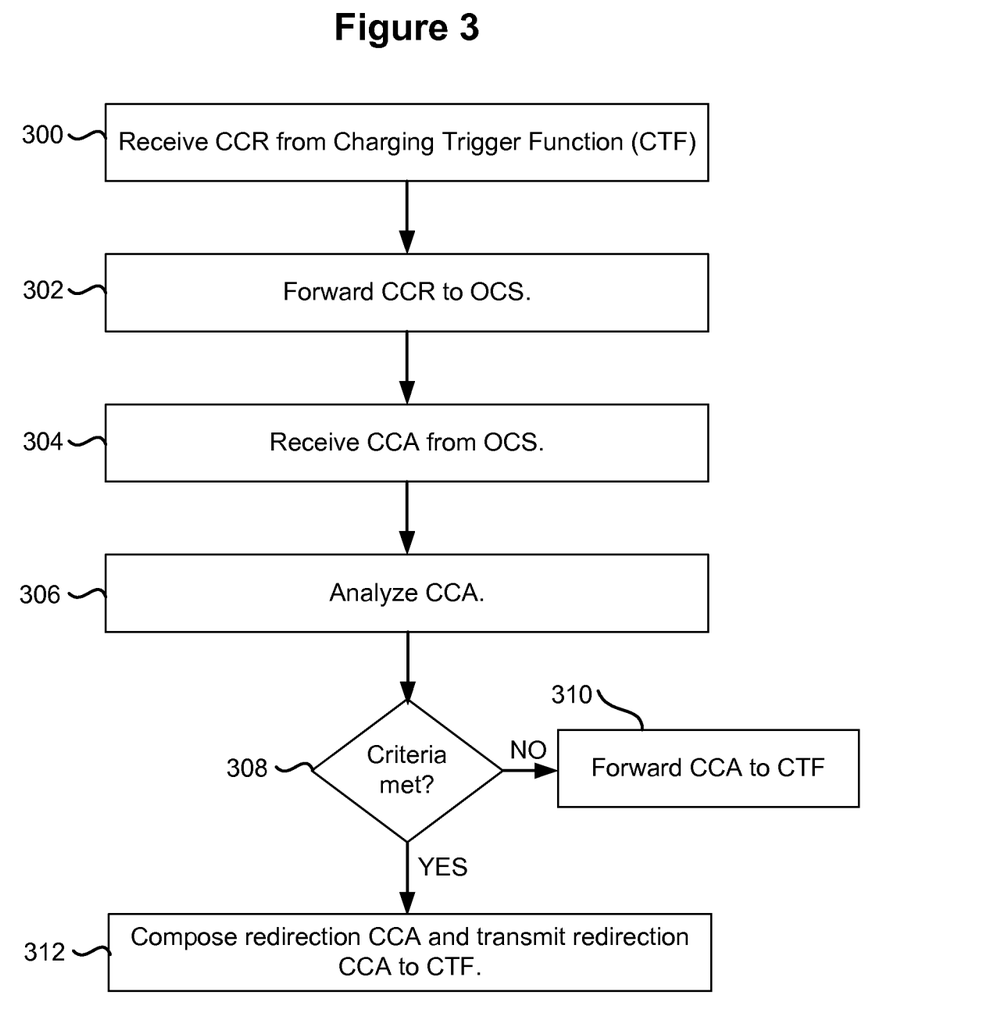
FIG. 3 shows a method of redirecting Diameter Credit Control Answers (CCA), in accordance with an embodiment of the invention.

FIG. 3 illustrates a method performed by a SCIM to provide the added redirection functionality to online charging systems which do not natively support redirection functionality. The SCIM can be configured to redirect based on configurable CCA attributes such as low balance or Final-Unit-Indication (FUI). If the selected criteria are met, the SCIM can insert redirection content into CCA to redirect the session to a top-up application.

At step 300, the SCIM receives a Credit Control Request (CCR) from a Charging Trigger Function (CTF). For example, the CCR may be received from a multimedia service which requires user payment. At step 302, the SCIM forwards the CCR to an appropriate Online Charging System (OCS). Note that, as described with respect to FIGS. 2A-2C, SCIM may utilize its own session-id for the forwarded CCR. Also, as described above, the OCS may or may not support the redirection aspects of Appendix VIII of RFC4006. At step 304, the SCIM receives a Credit Control Answer (CCA) from the OCS sent in response to the CCR.

At step 306, 308 the SCIM analyzes the CCA received from the OCS against certain criteria to determine whether it is necessary to provide enhanced redirection functionality. The enhanced redirection functionality may be provided for example in response to a CCA containing one of the following criteria values from an OCS indicating a low or empty account balance for the subscriber:

FUI (Final-Unit-Indicator)
NO_MONEY_NOTIFICATION
LOW_CREDIT_NOTIFICATION

If the criteria are not met (decision 308), for example, if the user has sufficient funds for the transaction, SCIM at step 310 forwards the CCA to the CTF. The CTF has thus established credit availability for this segment of the service session.

However, if the criteria are met (decision 308), SCIM, at step 312, composes a redirection CCA and transmits the redirection CCA to the CTF. The composed CCA may be based in part on the CCA received from the OCS and may include modified and/or additional AVPs. In this example the CCA is augmented with redirection information that allows for redirection of the user to an Application (APP). As described with respect to FIGS. 2A-2C, in conjunction with the redirection, the SCIM may optionally terminate the session towards the OCS and/or terminate the session towards the user. In preferred embodiments, however, where possible, the SCIM maintains the user session to allow for seamless provision of service to the user even where the initial session is terminated with respect to the OCS. Where the OCS terminates the session (e.g. returning no credits) the existing user session can be redirected and a new OCS session may be started. Where the OCS does not terminate the session (e.g. returns final allocation/other condition), the existing user session may be redirected immediately or after the allocated units have been consumed.

It should be noted that the redirection criteria and the application to which the session is redirected are configurable. Thus, the method of FIG. 3 can be used to different criteria than described above, and the method can redirect to an Application other than the top-up server described, for example, with respect to FIG. 2A.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cads, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method for providing redirection functionality in a telecommunications network having a Charging Trigger Function (CTF) and an online charging system (OCS), the method comprising:
    providing a Session Redirection Module in a Service Capability Interaction Manager (SCIM) in the telecommunications network;
    initiating by the CTF a credit communication session from the CTF to the OCS through the SCIM;
    receiving at the SCIM from the CTF a first Credit Control Request (CCR) message, the first CCR message including a first credit communication session identifier used by the CTF to identify the credit communication session;
    forwarding the first CCR message by the SCIM to the OCS as a second CCR message, the second CCR message including a second credit communication session identifier used by the SCIM to identify a first portion of the credit communication session initiated by the CTF between the SCIM and the OCS;
    receiving at the SCIM from the OCS via the credit communication session a first Credit Control Answer (CCA) message directed to the CTF, the first CCA message being responsive to the second CCR message and including the second credit communication session identifier;
    comparing the first CCA message against criteria for redirection using the Session Redirection Module and determining as a first result of the comparing that the first CCA message does not meet the criteria for redirection;
    responsive to determining as the first result of the comparing that the first CCA message does not meet the criteria for redirection, forwarding the first CCA message which does not meet the criteria for redirection from the SCIM to said CTF via the credit communication session as a first response CCA message, the first response CCA message including the first credit communication session identifier used by the CTF to identify the credit communication session;
    subsequent to receiving the first CCR message at the SCIM and forwarding the first response CCA message from the SCIM to the CTF, receiving at the SCIM from the CTF a third CCR message, the third CCR message including the first credit communication session identifier used by the CTF to identify the credit communication session;
    forwarding the third CCR message by the SCIM to the OCS as a fourth CCR message, the fourth CCR message including a third credit communication session identifier used by the SCIM to identify a second portion of the credit communication session initiated by the CTF between the SCIM and the OCS;
    receiving at the SCIM from the OCS via the credit communication session a second CCA message directed to the CTF, the second CCA message being responsive to the fourth CCR message and including the third credit communication session identifier;
    comparing the second CCA message against the criteria for redirection using the Session Redirection Module and determining as a second result of the comparing that the second CCA message does meet the criteria for redirection; and
    responsive to determining as the second result of the comparing that the second CCA message does meet the criteria for redirection:
        terminating by the SCIM the second portion of the credit communication session between the SCIM and the OCS;
        augmenting by the SCIM the second CCA message which does meet the criteria for redirection as a Redirection CCA message by inserting redirection information associated with an associated service delivery credit unit top-up application into the second CCA message which does meet the criteria for redirection, thereby forming the Redirection CCA message, wherein the Redirection CCA message includes the first credit communication session identifier used by the CTF to identify the credit communication session;

transmitting in the credit communication session the Redirection CCA message from the SCIM to the CTF, wherein the inserted redirection information of the Redirection CCA message redirects the credit communication session by the CTF towards the associated service delivery credit unit top-up application without terminating the credit communication session between the CTF and the SCIM;

receiving in the credit communication session at the SCIM from the CTF a fifth CCR message providing updated credit control information to the OCS, the fifth CCR message having the first credit communication session identifier used by the CTF to identify the credit communication session;

initiating by the SCIM a new portion of the credit communication session between the SCIM and the OCS responsive to receiving the fifth CCR message including the first credit communication session identifier used by the CTF to identify the credit communication session; and forwarding a sixth CCR message in the new portion of the credit communication session by the SCIM to the OCS, the sixth CCR message comprising the fifth CCR message and having a fourth credit communication session identifier used by the SCIM to identify the new credit communication session initiated by the SCIM between the SCIM and the OCS.

2. The method of claim 1, wherein the criteria for redirection include presence in the first CCA answer of one or more of:
   a FUI (Final-Unit-Indicator) representative of final credit units of the associated service delivery being available;
   a NO_MONEY_NOTIFICATION representative of no credit units of the associated service delivery being available; and
   a LOW_CREDIT_NOTIFICATION representative of a low quantity of the credit units of the associated service delivery being available.

3. The method of claim 1, further comprising, prior to receiving said first CCA message:
   receiving a Credit Control Request (CCR) message from said CTF; and
   forwarding the CCR message to said OCS.

4. The method of claim 1, wherein said Redirection CCA comprises one or more of:
   a Validity-Time parameter;
   a Redirect-Address-Type parameter; and
   a Redirect-Address-Address parameter.

5. The method of claim 1, wherein said Redirection CCA redirects the credit communication session towards the associated service delivery credit unit top-up application providing an increased amount of credit available to said credit communication session initiated by the CTF.

6. The method of claim 1, wherein said Redirection CCA redirects the credit communication session towards the associated service delivery credit top-up application performing a top-up credit transaction without terminating the credit communication session initiated by the CTF and having the first credit communication session identifier used by the CTF to identify the credit communication session.

7. The method of claim 1, wherein said Redirection CCA redirects the credit communication session having the first credit communication session identifier, terminates the credit communication session of the OCS having the fourth credit communication session identifier, and subsequently starts the credit communication session of the OCS having the third credit communication session identifier without terminating the credit communication session between the CTF and the SCIM having the first credit communication session identifier.

8. A non-transitory computer readable storage medium including instructions stored thereon for providing redirection functionality in a telecommunication network having a Charging Trigger Function (CTF) and an online charging system OCS, which instructions, when executed by a computer, cause the computer to perform steps comprising:
   providing a Session Redirection Module in a Service Capability Interaction Manager (SCIM) in the telecommunications network;
   initiating by the CTF a credit communication session from the CTF to the OCS through the SCIM;
   receiving at the SCIM from the CTF a first Credit Control Request (CCR) message, the first CCR message including a first credit communication session identifier used by the CTF to identify the credit communication session;
   forwarding the first CCR message by the SCIM to the OCS as a second CCR message, the second CCR message including a second credit communication session identifier used by the SCIM to identify a first portion of the credit communication session initiated by the CTF between the SCIM and the OCS;
   receiving at the SCIM from the OCS via the credit communication session a first Credit Control Answer (CCA) message directed to the CTF, the first CCA message being responsive to the second CCR message and including the second credit communication session identifier;
   comparing the first CCA message against criteria for redirection using the Session Redirection Module and determining as a first result of the comparing that the first CCA message does not meet the criteria for redirection;
   responsive to determining as the first result of the comparing that the first CCA message does not meet the criteria for redirection, forwarding the first CCA message which does not meet the criteria for redirection from the SCIM to said CTF via the credit communication session as a first response CCA message, the first response CCA message including the first credit communication session identifier used by the CTF to identify the credit communication session;
   subsequent to receiving the first CCR message at the SCIM and forwarding the first response CCA message from the SCIM to the CTF, receiving at the SCIM from the CTF a third CCR message, the third CCR message including the first credit communication session identifier used by the CTF to identify the credit communication session;
   forwarding the third CCR message by the SCIM to the OCS as a fourth CCR message, the fourth CCR message including a third credit communication session identifier used by the SCIM to identify a second portion of the credit communication session initiated by the CTF between the SCIM and the OCS;
   receiving at the SCIM from the OCS via the credit communication session a second CCA message directed to the CTF, the second CCA message being responsive to the fourth CCR message and including the third credit communication session identifier;
   comparing the second CCA message against the criteria for redirection using the Session Redirection Module and determining and determining as a second result of the comparing that the second CCA message does meet the criteria for redirection; and responsive to determining as the second result of the comparing that the second CCA message does meet the criteria for redirection:

terminating by the SCIM the second portion of the credit communication session between the SCIM and the OCS;

augmenting by the SCIM the second CCA message which does meet the criteria for redirection as a Redirection CCA message by inserting redirection information associated with an associated service delivery credit unit top-up application into the second CCA message which does meet the criteria for redirection, thereby forming the Redirection CCA message, wherein the Redirection CCA message includes the first credit communication session identifier used by the CTF to identify the credit communication session;

transmitting in the credit communication session the Redirection CCA message from the SCIM to the CTF, wherein the inserted redirection information of the Redirection CCA message redirects the credit communication session by the CTF towards the associated service delivery credit unit top-up application without terminating the credit communication session between the CTF and the SCIM;

receiving in the credit communication session at the SCIM from the CTF a fifth CCR message for-providing updated credit control information to the OCS, the fifth CCR message having the first credit communication session identifier used by the CTF to identify the credit communication session;

initiating by the SCIM a new portion of the credit communication session between the SCIM and the OCS responsive to receiving the fifth CCR message including the first credit communication session identifier used by the CTF to identify the credit communication session; and forwarding a sixth CCR message in the new portion of the credit communication session by the SCIM to the OCS, the sixth CCR message comprising the fifth CCR message and having a fourth credit communication session identifier used by the SCIM to identify the new credit communication session initiated by the SCIM between the SCIM and the OCS.

9. The non-transitory computer readable storage medium of claim 8, wherein the criteria for redirection include one or more of:

a FUI (Final-Unit-Indicator) representative of final credit units of the associated service delivery being available;

a NO_MONEY_NOTIFICATION representative of no credit units of the associated service delivery being available; and a LOW_CREDIT_NOTIFICATION representative of a low quantity of credit units of the associated service delivery being available.

10. The non-transitory computer readable storage medium of claim 8, wherein the method further comprises:

receiving a Credit Control Request (CCR) message from said CTF; and forwarding the CCR message to said OCS.

11. The non-transitory computer readable storage medium of claim 8, wherein said Redirection CCA comprises one or more of:

a Validity-Time parameter;

a Redirect-Address-Type parameter; and a Redirect-Address-Address parameter.

12. The non-transitory computer readable storage medium of claim 8, wherein said Redirection CCA redirects the credit communication session towards the associated service delivery credit top-up server providing an increased amount of credit available to said credit communication session initiated by the CTF.

13. The non-transitory computer readable storage medium of claim 8, wherein said Redirection CCA redirects the credit communication session towards the associated service delivery credit top-up server without terminating the credit communication session initiated by the CTF and having the first credit communication session identifier used by the CTF to identify the credit communication session.

14. The non-transitory computer readable storage medium of claim 8, wherein said Redirection CCA redirects the credit communication session towards an associated service delivery credit unit top-up server, terminates the credit communication session of the OCS having the fourth credit communication session identifier, and subsequently starts the credit communication session of the OCS having the third credit communication session identifier without terminating the credit communication session having the first credit communication session identifier.

15. A system providing redirection functionality in an associated telecommunication network having a Charging Trigger Function (CTF) and an online charging system (OCS), the system comprising:

a Service Capability Interaction Manager (SCIM) in the associated telecommunication network; and a Session Redirection Module in the SCIM in the associated telecommunications network;

wherein the SCIM is configured to receive from the CTF a first Credit Control Request (CCR) message, the first CCR message including a first credit communication session identifier used by the CTF to identify a credit communication session initiated by the CTF from the CTF to the OCS through the SCIM, wherein the SCIM is configured to forward the first CCR message to the OCS as a second CCR message, the second CCR message including a second credit communication session identifier used by the SCIM to identify a first portion of the credit communication session initiated by the CTF between the SCIM and the OCS, wherein the SCIM is configured to receive from the OCS via the credit communication session a first Credit Control Answer (CCA) message directed to the CTF, the first CCA message being responsive to the second CCR message and including the second credit communication session identifier, wherein the Session Redirection Module is configured to compare the first CCA message against criteria for redirection and determines as a first result of the comparing that the first CCA message does not meet the criteria for redirection, wherein, responsive to determining as the first result of the comparing that the first CCA message does not meet the criteria for redirection, the Session Redirection Module is configured to forward the first CCA message which does not meet the criteria for redirection from the SCIM to said CTF via the credit communication session as a first response CCA message, the first response CCA message including the first credit communication session identifier used by the CTF to identify the credit communication session, wherein, subsequent to receiving the first CCR message at the SCIM and forwarding the first response CCA message from the SCIM to the CTF, the SCIM is configured to receive from the CTF a third CCR message, the third CCR message including the first credit communication session identifier used by the CTF to identify the credit communication session;

wherein the SCIM is configured to forward the third CCR message to the OCS as a fourth CCR message, the fourth CCR message including a third credit communication session identifier used by the SCIM to identify a second portion of the credit communication session initiated by the CTF between the SCIM and the OCS;

wherein the SCIM is configured to receive from the OCS via the credit communication session a second CCA message directed to the CTF, the second CCA message being responsive to the fourth CCR message and including the third credit communication session identifier, wherein the Session Redirection Module is configured to compare the second CCA message against the criteria for redirection using the Session Redirection Module and determine as a second result of the comparing that the second CCA message does meet the criteria for redirection, and wherein, responsive to determining as the second result of the comparing that the second CCA message does meet the criteria for redirection, the Session Redirection Module is configured to:

terminate the second portion of the credit communication session between the SCIM and the OCS, augment the second CCA message which does meet the criteria for redirection as a Redirection CCA message by inserting redirection information associated with an associated service delivery credit unit top-up application into the second CCA message which does meet the criteria for redirection, thereby forming the Redirection CCA message, wherein the Redirection CCA message includes the first credit communication session identifier used by the CTF to identify the credit communication session, transmit in the credit communication session the Redirection CCA message from the SCIM to the CTF, wherein the inserted redirection information of the Redirection CCA message redirects the credit communication session by the CTF towards the associated service delivery credit unit top-up application without terminating the credit communication session between the CTF and the SCIM, receive in the credit communication session at the SCIM from the CTF a second CCR message providing updated credit control information to the OCS, the fifth CCR message having the first credit communication session identifier used by the CTF to identify the credit communication session, initiate a new portion of the credit communication session between the SCIM and the OCS responsive to receiving the fifth CCR message including the first credit communication session identifier used by the CTF to identify the credit communication session, and forward a sixth CCR message in the new portion of the credit communication session by the SCIM to the OCS, the sixth CCR message comprising the fifth CCR message and having a fourth credit communication session identifier used by the SCIM to identify the new credit communication session initiated by the SCIM between the SCIM and the OCS.

16. The system of claim 15, wherein the criteria for redirection include presence in CCA of one or more of:
a FUI (Final-Unit-Indicator) representative of final credit units of the associated service delivery being available;
a NO_MONEY_NOTIFICATION representative of no credit units of the associated service delivery being available; and
a LOW_CREDIT_NOTIFICATION representative of a low quantity of credit units of the associated service delivery being available.

17. The system of claim 15, wherein said Redirection CCA comprises one or more of:
a Validity-Time parameter;
a Redirect-Address-Type parameter; and
a Redirect-Address-Address parameter.

18. The system of claim 15, wherein said Redirection CCA message is configured to redirect the credit communication session towards an associated service delivery top-up server without terminating the credit communication session initiated by the CTF and having the first credit communication session identifier used by the CTF to identify the credit communication session.

* * * * *

UNITED STATES PATENT AND TRADEMARK OFFICE
CERTIFICATE OF CORRECTION

PATENT NO. : 10,115,135 B2  
APPLICATION NO. : 13/934904  
DATED : October 30, 2018  
INVENTOR(S) : Livne et al.

Page 1 of 1

It is certified that error appears in the above-identified patent and that said Letters Patent is hereby corrected as shown below:

In the Specification

In Column 6, Line 32, delete "and or" and insert -- and/or --, therefor.

In Column 7, Line 17, delete "and or" and insert -- and/or --, therefor.

In Column 8, Line 2, delete "and or" and insert -- and/or --, therefor.

In the Claims

In Column 12, Line 67, in Claim 8, before "as" delete "and determining".

In Column 13, Lines 30-31, in Claim 8, delete "for-providing" and insert -- providing --, therefor.

Signed and Sealed this  
Twenty-ninth Day of October, 2019

Andrei Iancu  
*Director of the United States Patent and Trademark Office*